United States Patent [19]
Schweppe et al.

[11] 4,425,581
[45] Jan. 10, 1984

[54] SYSTEM FOR OVERLAYING A COMPUTER GENERATED VIDEO SIGNAL ON AN NTSC VIDEO SIGNAL

[75] Inventors: Darrell L. Schweppe; Hermann K. Siegl, both of Lincoln, Nebr.

[73] Assignee: Corporation For Public Broadcasting, Washington, D.C.

[21] Appl. No.: 255,039

[22] Filed: Apr. 17, 1981

[51] Int. Cl.$^3$ ............... H04N 5/04; H04N 5/22; H04N 5/14
[52] U.S. Cl. ................. 358/148; 358/149; 358/141; 358/183; 358/140; 358/903; 340/721; 340/744; 364/514; 364/521
[58] Field of Search ............ 358/141, 148, 146, 150, 358/152, 160, 183, 185, 182, 903, 181, 139, 140, 149; 364/514, 515, 518, 521; 340/721, 744, 747, 734, 748

[56] References Cited
U.S. PATENT DOCUMENTS

| | | | |
|---|---|---|---|
| 3,008,001 | 11/1961 | Reith | 358/83 |
| 3,898,377 | 8/1975 | Fairbairn et al. | 358/148 X |
| 4,346,407 | 8/1982 | Baer et al. | 358/148 X |
| 4,372,655 | 2/1983 | Matsumura et al. | 351/206 |

*Primary Examiner*—Robert L. Richardson
*Attorney, Agent, or Firm*—Staas & Halsey

[57] ABSTRACT

A system for overlaying a computer generated video signal on an NTSC video signal includes horizontal and vertical pulse processor circuits for generating a horizontal start signal and a vertical reset signal, respectively, in accordance with NTSC standards, and a clocking system for receiving the vertical reset signal and the horizontal start signal and for generating control signals to control the read out of video data from the video generator of a computer so that it is read out at an NTSC rate. The system further includes a video insert keyer circuit for combining the NTSC video signal and the computer generated video signal and for generating a composite video signal for transmission to a monitor or standard television.

21 Claims, 5 Drawing Figures

SYSTEM FOR OVERLAYING A COMPUTER GENERATED VIDEO SIGNAL ON AN NTSC VIDEO SIGNAL

BACKGROUND OF THE INVENTION

The present invention is directed to a system for overlaying a computer generated video signal on an NTSC (National Television Standards Committee) video signal to obtain a composite video signal for input to a monitor or a standard television.

Recently, there has been a large increase in the use of various types of video devices. Such devices include, for example, videodisc players and videotape players. These systems produce so-called NTSC video signals, i.e., the type of signals which are received by a standard television in the United States. With the advance in video device technology, there has been a desire to overlay computer generated graphics onto the NTSC video signals which are produced by, for example, a videodisc player. However, in general, computers generate a video signal having a vertical frequency of 60 Hz and a horizontal frequency of 15.840 kHz. In contrast, the standard television (NTSC) video signal has a vertical frequency of 59.94 Hz and a horizontal frequency of 15.734 kHz. In addition, the NTSC video signal produces interlaced scanning while a computer scans each field (picture) in the same position. Thus, the incompatibility between the NTSC video signal and the computer generated video signal has made the overlaying of the computer generated video signal on the NTSC video signal impossible.

There exist, in the prior art, systems which employ phase locked loop circuits for locking the main clock of a computer onto the NTSC frequencies. However, since the phase-locked loop circuit is unstable, and because the NTSC signal provided by, for example, a videodisc player, is unstable, no satisfactory overlay has been achieved.

One other prior art system employs two monitors, one for the NTSC video signal and one for the computer generated video signal. However, the obvious disadvantages of having to view two monitors have made this an inadequate substitute for the overlaying of the computer generated video signal on the NTSC video signal for viewing on a single monitor.

There is therefore a need in the industry for a system which adjusts the read out of the character generator of a computer so that the computer generated video signal is read out at the NTSC rate and combined with an NTSC video signal from an outside source such as a videodisc player.

SUMMARY OF THE INVENTION

An object of the present invention is to provide a system for overlaying a computer generated video signal on an NTSC video signal which overcomes the deficiencies of prior art systems.

In particular, it is an object of the present invention to provide a system which controls the computer to read out the computer generated video signal at the NTSC signal rate.

A further object of this invention is to provide a system for overlaying the computer generated video signal onto an NTSC video signal from an outside source so that the composite video signal is placed in a condition for transmission to a display, such as a monitor.

A further object of this invention is to provide a system in which the spacing between characters generated by the computer may be varied in dependence upon the number of characters to be displayed on a line.

A still further object of this invention is to provide such a system in which the composite video signal may be provided for viewing on a standard television.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
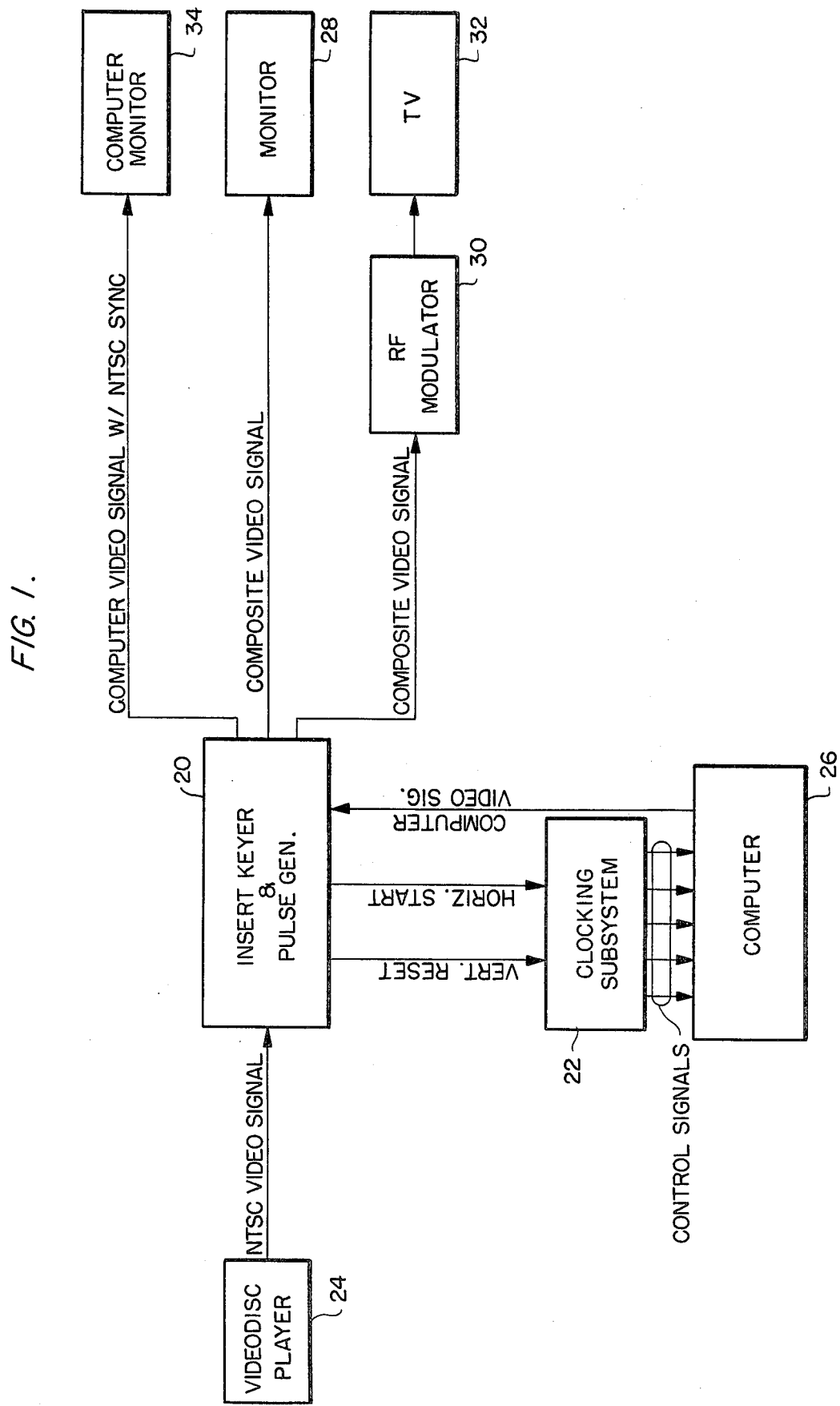
FIG. 1 is a block diagram illustrating the system of the present invention and its connection to an NTSC video signal source, a computer, and various display devices.

FIG. 1 illustrates the overall system of the present invention. The system includes an insert keyer and pulse generator subsystem 20 and a clocking subsystem 22. An NTSC video signal source 24 transmits an NTSC video signal to the insert keyer and pulse generator subsystem 20. In the preferred embodiment, the NTSC video signal source is a videodisc player such as the DiscoVision Associates MCA PR7820 videodisc player. However, the system of the present invention can also be used with a camera, a videotape player, or any other NTSC video signal source. For convenience, the NTSC video signal source 24 is hereinafter referred to as a videodisc player.

The insert keyer and pulse generator subsystem 20 generates a vertical reset signal and a horizontal start signal and transmits these signals to the clocking subsystem 22. The clocking subsystem 22 generates control signals and transmits these control signals to a computer 26 to cause the computer to generate a computer video signal at the NTSC rate. In the preferred embodiment, the computer 26 is a Radio Shack TRS80 Model 1 computer. However, any one of a variety of computers and microcomputers may be employed. The computer video signal (an NTSC signal) is transmitted to the insert keyer and pulse generator subsystem 20 which combines the NTSC video signal with the computer video signal and generates a composite video signal. This composite video signal is transmitted for display on a monitor 28. Alternatively, the composite video signal may be transmitted to an RF modulator 30 and then to a standard television 32. In addition, the insert keyer and pulse generator subsystem strips the sync signal from the NTSC video signal provided by the videodisc player 24, strips the computer video signal generated by the computer 26 and combines these two stripped signals for transmission to a computer monitor 34. The computer monitor 34 may be used during programming to eliminate the distractions of the video display from the videodisc player 24. Thus, the output of the insert keyer and pulse generator subsystem 20 can be used to generate various types of displays.

Figure 2:
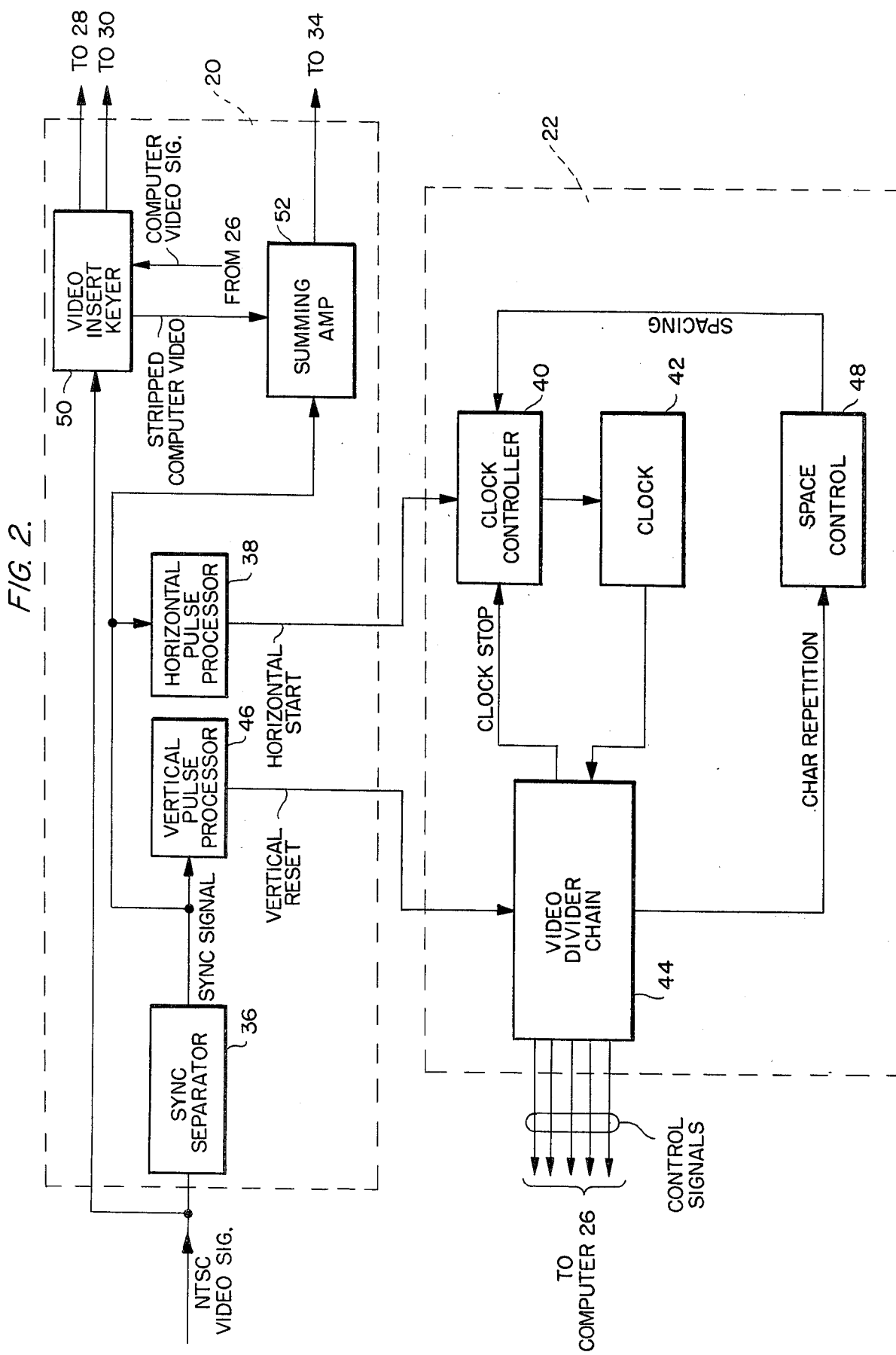
FIG. 2 is a block diagram of the insert keyer and pulse generator subsystem and the clocking subsystem of FIG. 1.

FIG. 2 is a block diagram illustrating the insert keyer and pulse generator subsystem 20 and the clocking subsystem 22 of the present invention. In the insert keyer and pulse generator subsystem 20 a sync separator circuit 36 receives the NTSC video signal and removes the video portion of the NTSC video signal, so that only a sync signal remains. A horizontal pulse processor circuit 38 receives the sync signal and generates a horizontal start signal to indicate where each line of a scan is to begin.

In the clocking subsystem 22, a clock controller circuit 40 receives the horizontal start signal and provides a control signal to a clock 42. The clock 42 provides an interrupted clock signal to a video divider chain 44 in dependence upon the control signal. The insert keyer and pulse generator subsystem 20 also includes a vertical pulse processor circuit 46 which generates the vertical reset signal and transmits this signal to the video divider chain 44. The video divider chain 44 generates control signals for the computer 26 under the control of the vertical reset signal and the clock signal. A space control circuit 48 receives a character repetition signal from the video divider chain 44 and generates a spacing signal for transmission to the clock controller circuit 40. This spacing signal indicates the desired spacing between characters in the display.

A video insert keyer circuit 50 in the insert keyer and pulse generator subsystem 20 receives the computer video signal (at an NTSC rate) from the computer 26 as well as the NTSC video signal from the videodisc player 24 and generates the composite video signal for output to the monitor 28 and the RF modulator 30. In addition, a summing amplifier 52 adds the sync signal to a stripped computer video signal generated by the video insert keyer circuit 50. The output of the summing amplifier 52 is then transmitted to the computer monitor 34.

Figure 3:
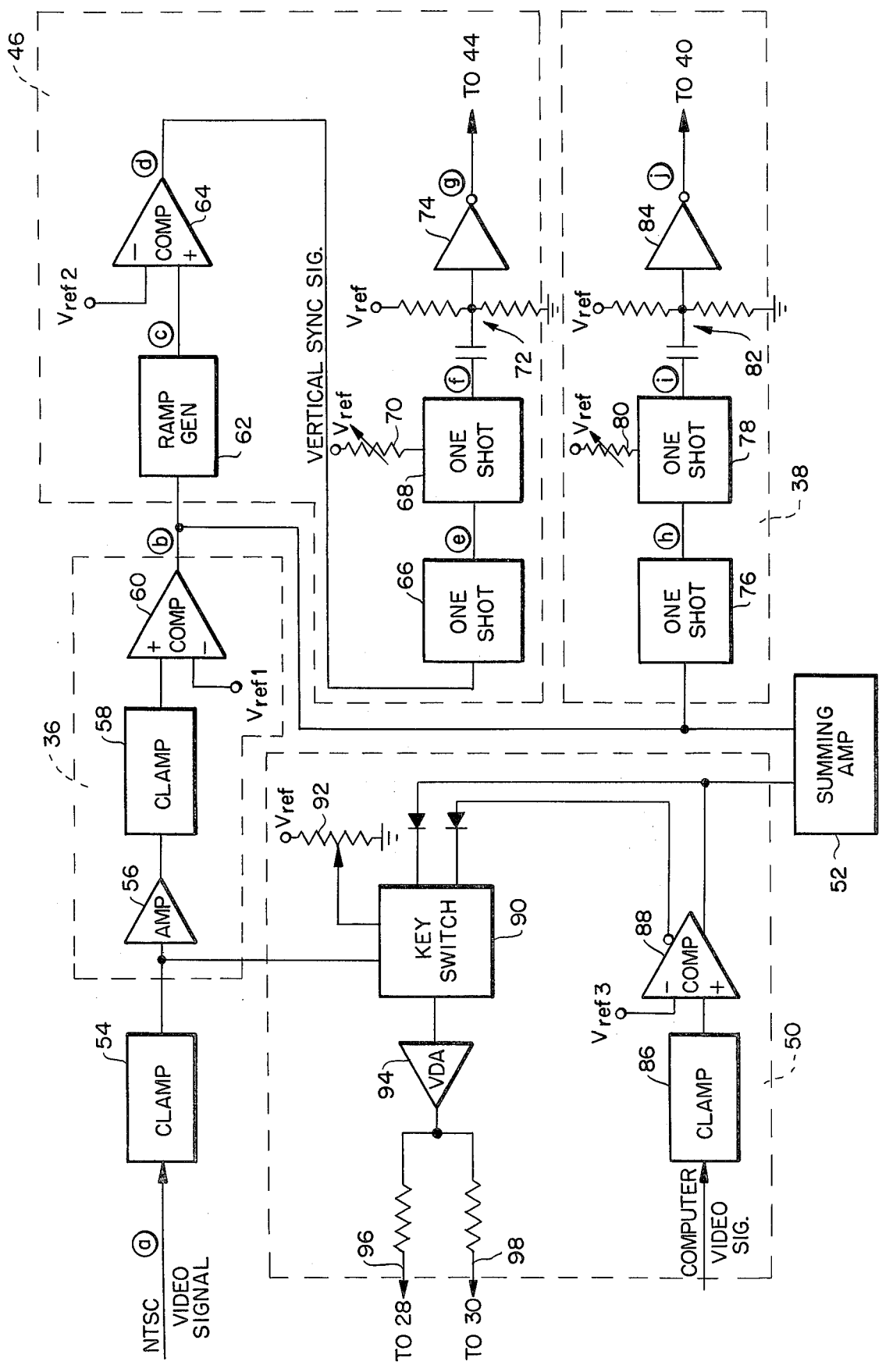
FIG. 3 is a circuit diagram of the insert keyer and pulse generator subsystem of FIG. 2.
Figure 5:
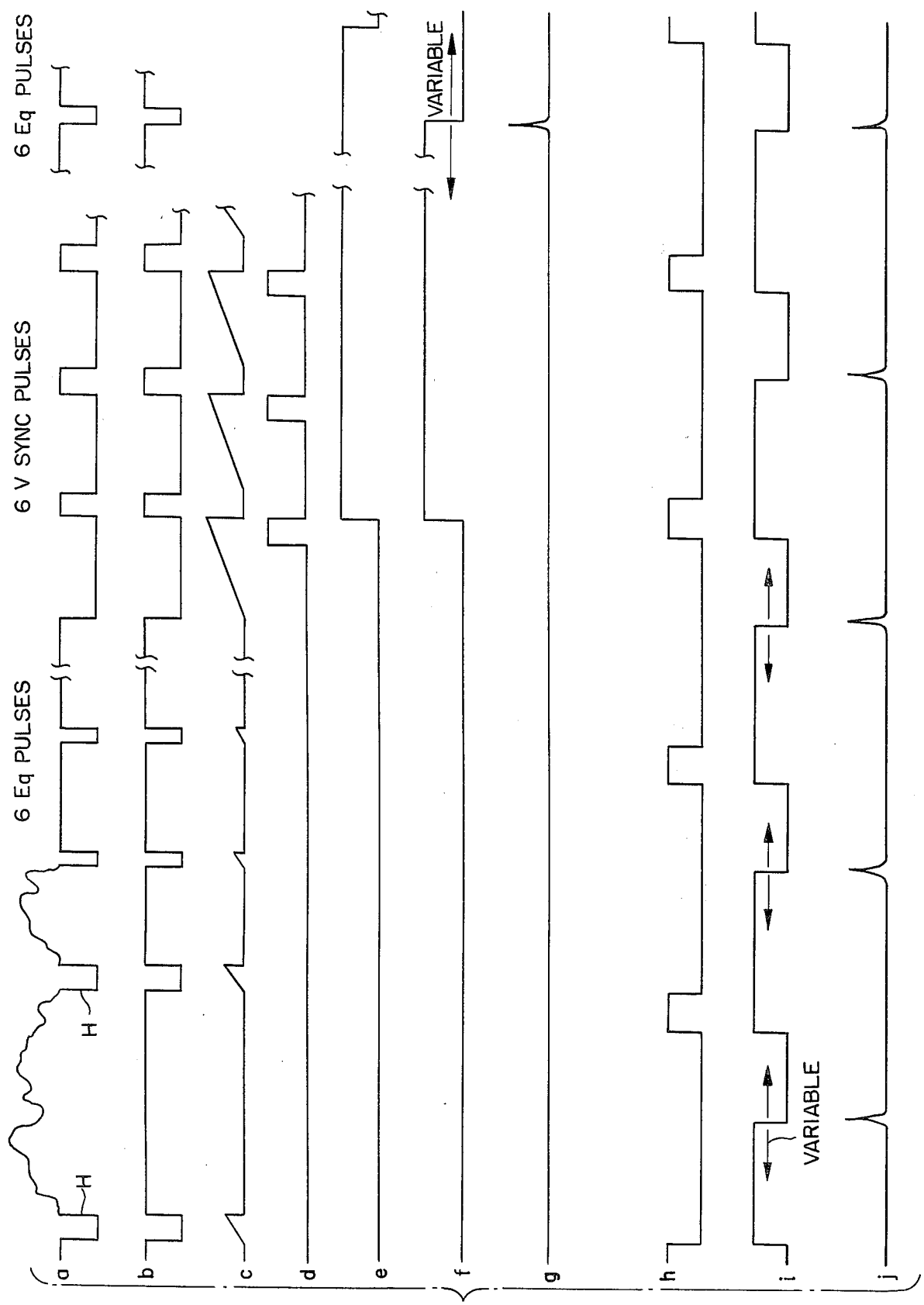
FIG. 5 is a graph illustrating the various waveforms which are generated by the circuit of FIG. 3.

FIG. 3 is a detailed circuit diagram of the elements of the insert keyer and pulse generator subsystem 20 which are illustrated in FIG. 2. The circuit of FIG. 3 will be described with reference to the various signals which are illustrated in FIG. 5. The lettered portions of the graph of FIG. 5 (a, b, c . . . ) correspond to the signals which are generated at the portions of the circuit of FIG. 3 which are marked with these letters.

The NTSC video signal (FIG. 5a) is received and referenced to ground by a clamp circuit 54, i.e., a DC restorer circuit. The sync separator 36 includes an amplifier 56, a clamping circuit 58 and a comparator 60. In the preferred embodiment, the NTSC video signal is amplified by a factor of 4 and is then compared with a reference voltage ($V_{Ref\,1}$) by the comparator 60. The reference voltage $V_{Ref\,1}$ is selected so that the video portion of the NTSC video signal is cut off (i.e., sliced) and only the sync signal (FIG. 5b) remains at the output of the comparator 60. In particular, the sync separator circuit 36 is a half level slicer.

The vertical pulse processor circuit 46 includes a ramp generator 62 which receives the sync signal from the comparator 60 and generates a sawtooth wave (FIG. 5c). The portions of the sawtooth which are generated by the vertical sync pulse have a greater amplitude than those generated by the equalizing pulses and the horizontal sync pulses. A comparator 64 compares the sawtooth output of the ramp generator 62 with a three forths level reference voltage ($V_{Ref\,2}$) and slices off the vertical sync signal (FIG. 5d), since only this signal is greater than the reference voltage $V_{Ref\,2}$. A one-shot multivibrator circuit 66 is triggered by the trailing edge of the first pulse of the vertical sync signal and stays on for the remaining pulses (FIG. 5e). A one-shot multivibrator circuit 68 is triggered by the leading edge of the output of the one-shot multivibrator circuit 66. The ON time of the one-shot multivibrator 68 is varied by a potentiometer 70 so as to provide control over the vertical positioning of a display on the monitor 28 (FIG. 5f). The trailing edge of the output of the one-shot multivibrator 68 is differentiated by a differentiator circuit 72 and inverted by an inverter 74 to produce the vertical reset signal (FIG. 5g). The vertical reset signal is a spike-like pulse which is provided to the video divider chain 44.

The horizontal pulse processor circuit 38 receives the stripped sync signal (FIG. 5b) and the leading edge of the pulses in the stripped sync signal triggers a one-shot multivibrator circuit 76 which masks out the half line pulses (i.e., the equalizing pulses and the vertical pulses). A one-shot multivibrator circuit 78 has a variable delay time, varied by a potentiometer 80, for adjusting the position of the horizontal field on the display of the monitor 28 (FIG. 5i). A differentiator circuit 82 differentiates the output of the one-shot multivibrator circuit 78 and an inverter 84 inverts the output of the differentiator circuit 82, to provide the horizontal start signal to the clock controller circuit 40 (FIG. 5j). In the preferred embodiment, the vertical reset signal and the horizontal start signal are 200 ns spikes.

The video insert keyer circuit 50 includes a clamp circuit 86 and a comparator 88 for producing the same type of half level slicing as the comparator 60. That is, the comparator 88 compares the computer video signal with a second half level voltage reference signal ($V_{Ref\,3}$) and generates a stripped computer video signal output and an inverted stripped computer video signal output for input to a key switch circuit 90. In effect, the comparator 88 generates a push-pull signal. The key switch circuit 90 receives the NTSC video signal and receives a variable DC level signal from a potentiometer 92. The key switch circuit 90 provides either the NTSC video signal or the variable DC level signal in dependence upon the stripped computer video signal and the inverted stripped computer video signal. The output of the key switch circuit 90 is the composite video signal. A video distribution amplifier 94 amplifies the composite video signal to provide a low impedance signal for driving the coaxial lines 96 and 98 which are connected to the monitor 28 and the RF modulator 30, respectively.

Figure 4:
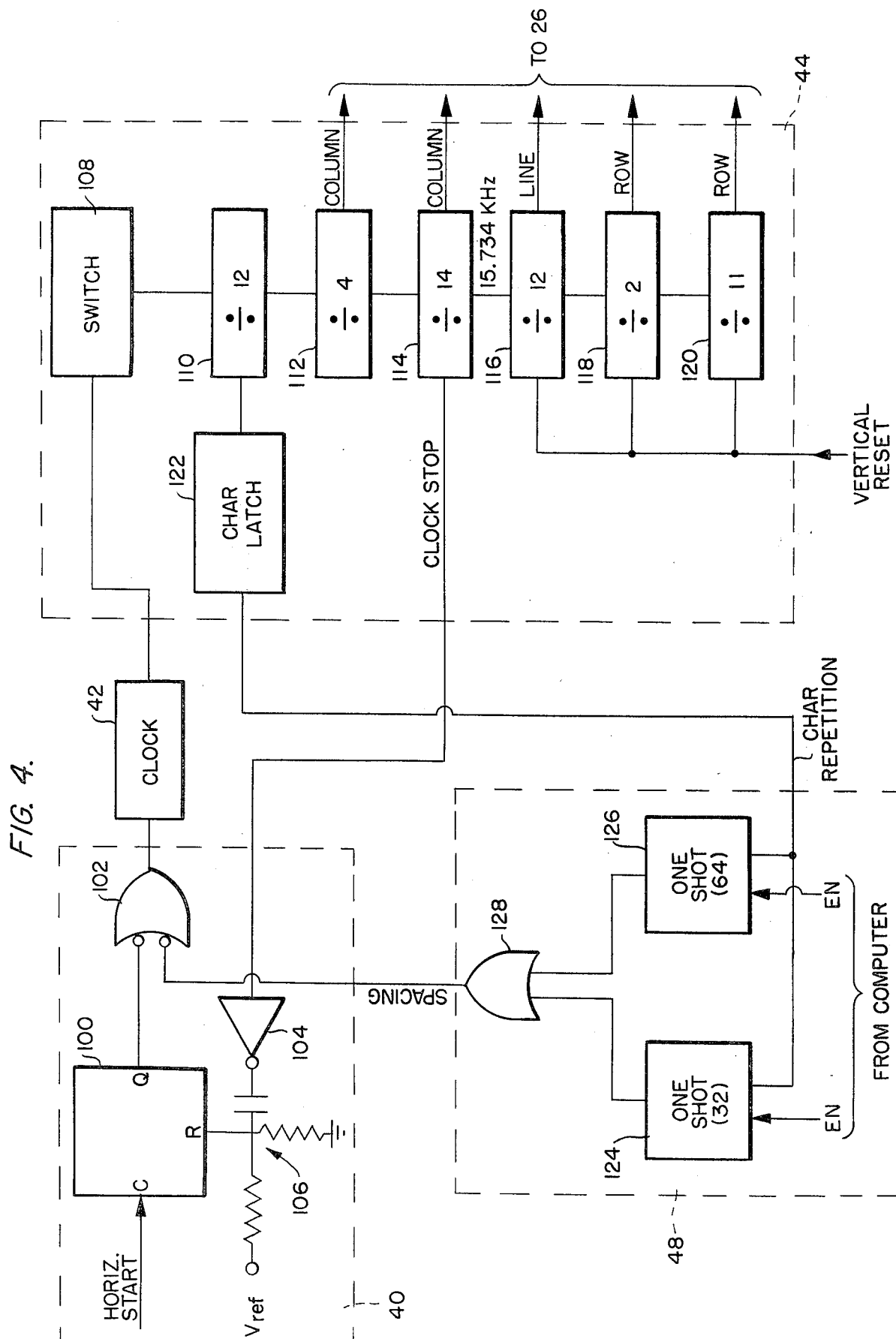
FIG. 4 is a circuit diagram of the clocking subsystem of FIG. 2.

FIG. 4 illustrates the details of the clocking subsystem 22 which is illustrated in FIG. 2. The clock controller circuit 40 includes a flip-flop 100 having a clock input which receives the horizontal start signal from the horizontal pulse processor circuit 38. Thus, a pulse in the horizontal start signal causes the flip-flop 100 to provide an output to the inverted input of an OR gate 102. The clock controller circuit 40 also includes an inverter 104 and a differentiator 106 for providing a pulse input to the reset input of the flip-flop 100. The output of the OR gate 102 is provided to the clock 42 which provides an intermittent clock signal to the video divider chain 44.

The video divider chain 44 includes a switch 108 for selectively providing an additional division factor in dependence upon the character mode used (for example, 32 or 64 characters per line may be employed). The switch 108 is connected to a divider chain including counters 110, 112 and 114. The counters 110, 112 and 114 are employed to divide the frequency of the clock signal. In the preferred embodiment, the counter 110 divides by 12, the counter 112 divides by 4, and the counter 114 divides by 14. This results in a natural divide frequency of 15.734 kHz (corresponding to the NTSC horizontal frequency) being output from the counter 114. When the counter 114 has finished its count, it generates a clock stop signal which is provided, via the inverter 104 and the differentiator 106, to the reset input of the flip-flop 100, thereby resetting the flip-flop and turning off the clock 42. In effect, the clock stop signal is employed to halt the horizontal scan of the computer. The output of the counter 114 is provided to an additional chain of counters including counter 116, counter 118 and counter 120. In the preferred embodiment, the counter 116 divides by 12, the counter 118 divides by 2 and the counter 120 divides by 11. If these last three counters (116, 118 and 120) were allowed to finish their count, they would have a natural divide frequency of 59.6 (i.e., lower than the NTSC vertical frequency). However, the vertical reset signal is provided to each of these counters (116, 118 and 120) to reset these counters at the NTSC vertical frequency (59.94 Hz). The counters 112, 114, 116, 118 and 120 generate the control signals which are provided to the computer 26 to cause the computer 26 to read out its stored video data at the NTSC rate. The counters 112 and 114 provide column control signals to the computer 26; the counter 116 provides a line control signal to the computer 26; and the counters 118 and 120 provide row control signals to the computer 26. It should be noted that there are 64 columns per line, 12 lines per row, and 16 rows per field in one application of the preferred embodiment of the present invention. The column number refers to the number of characters per line. For example, in some circumstances it may be desirable to have 32 characters (columns) per line. The video divider chain 44 further includes a character latch circuit 122 which generates a character repetition signal for the space control circuit 48. It should be noted that the video divider chain 44 may be formed as indicated above and connected to the video generator portion of the computer 26. Alternatively, the video divider chain which is located in the computer (e.g., in the Radio Shack TRS80 computer) may be adapted to operate in the manner outlined above. Thus, by altering the video divider chain present in the computer, by disconnecting the computer clock from the video divider chain, and by connecting the clock controller circuit 40, the clock 42 and the space control circuit 48 of the present invention to the video divider chain, the clocking subsystem 22 of the present invention may be formed.

The space control circuit 48 includes two one-shot multivibrator circuits 124 and 126, each of which receives the character repetition signal. Only one of the one-shot multivibrator circuits 124 and 126 is enabled by the computer 26 (EN). The determination of which of the one-shot multivibrator circuits 124 and 126 is to be enabled depends upon the desired number of characters per line (e.g., 32 or 64) to be displayed. The one-shot multivibrator circuits 124 and 126 are selectively turned on for a predetermined period of time so as to provide spacing between the characters on the display. Thus, the outputs of the one-shot multivibrator circuits 124 and 126 are provided to an OR gate 128 which provides, as an output, a spacing signal to the OR gate 102 for selectively turning off the clock 42 for a brief period of time to provide the desired spacing between characters.

The operation of the system will now be described with reference to FIGS. 3 and 4 of the drawings. The NTSC video signal is received and a sync signal generated by the sync separator circuit 36. The horizontal pulse processor circuit 38 receives the stripped sync signal, generates the horizontal start signal and provides this signal to the flip-flop 100 in the clock controller circuit 40. This sets the flip-flop 100 and turns the clock 42 on, thereby starting the counting process by the video divider chain 44. Once the counted output of the counter 114 indicates that a line has been scanned, a clock stop signal is transmitted to the clock controller circuit 40 so that the flip-flop 100 is reset, thereby turning off the clock 42 until the next pulse appears in the horizontal start signal. As the field (picture) of the display is being scanned, the counters 112, 114, 116, 118 and 120 provide control signals to the computer 26 to control the rate at which the video data stored in the computer 26 is read out. The vertical pulse processor circuit 46 receives the sync signal from the sync separator circuit 36 and generates the vertical reset signal. The vertical reset signal is provided to the counters 116, 118 and 120 to recycle the count at the end of one field. During the horizontal scanning process, the character latch 122 which is connected to the counter 110 generates a character repetition signal for the space control circuit 48. The space control circuit 48 provides a spacing signal to turn the clock 42 on and off so as to provide spacing between the characters on a line.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A system, operatively connected to a computer for providing a computer video signal, for overlaying the computer video signal on an NTSC video signal, comprising:

first means for providing the NTSC video signal;

second means, operatively connected to said first means, for receiving the NTSC video signal and for generating a vertical reset signal and a horizontal start signal;

third means, operatively connected to said second means, for generating a clock control signal in dependence upon the horizontal start signal;

a clock, operatively connected to said third means, for generating a clock signal in dependence upon the clock control signal;

fourth means, operatively connected to said clock, said second means and the computer, for generating control signals for controlling the read out of the computer video signal by the computer, the control signals being generated in dependence upon the clock signal and the vertical reset signal;

fifth means, operatively connected to said first means and to the computer, for receiving the NTSC video signal and the computer video signal, and for generating a composite video signal.

2. A system as set forth in claim 1, wherein said second means comprises:

a sync separator circuit, operatively connected to said first means, for receiving the NTSC video signal and for providing, as an output, a sync signal;

a vertical pulse processor circuit, operatively connected to said sync separator circuit and to said fourth means, for receiving the sync signal and for generating the vertical reset signal; and a horizontal pulse processor circuit, operatively connected to said sync separator circuit and to said third means, for receiving the sync signal and for generating the horizontal start signal.

3. A system as set forth in claim 2, wherein said sync separator circuit comprises:

an amplifier, operatively connected to said first means, for amplifying the NTSC video signal;

means for providing a first half level reference signal; and a first comparator, operatively connected to said amplifier and said means for providing the first half level reference signal, for generating the sync signal.

4. A system as set forth in claim 3, wherein said vertical pulse processor circuit comprises:

a ramp generator, operatively connected to said first comparator, for generating a sawtooth signal;

means for providing a three forths level reference signal;

a second comparator, operatively connected to said means for providing the three forths level reference signal and to the ramp generator, for generating a vertical sync signal;

a first one-shot multivibrator, operatively connected to said second comparator, for generating a first monostable signal;

a second one-shot multivibrator, operatively connected to said first one-shot multivibrator, for generating a second monostable signal having a variable pulse width; and a first differentiator, operatively connected to said second one-shot multivibrator and to said fourth means, for generating the vertical reset signal.

5. A system as set forth in claim 3 or 4, wherein said horizontal pulse processor circuit comprises:

a third one-shot multivibrator, operatively connected to said first comparator, for generating a third monostable signal;

a fourth one-shot multivibrator, operatively connected to said third one-shot multivibrator, for generating a fourth monostable signal having a variable pulse width; and a second differentiator, operatively connected to said fourth one-shot multivibrator and to said third means, for generating the horizontal start signal.

6. A system as set forth in claim 2, wherein said fourth means comprises a video divider chain, operatively connected to said third means, said clock, said vertical pulse processor circuit and the computer, said video divider chain generating and transmitting a clock stop signal to said third means, said video divider chain further generating a character repetition signal, said system further comprising a space control circuit, operatively connected between said video divider chain and said third means, for receiving said character repetition signal and for generating a spacing signal for transmission to said third means, wherein the clock control signal is provided to said clock in dependence upon the spacing signal, the clock stop signal, and the horizontal start signal.

7. A system as set forth in claim 6, wherein said third means comprises a clock controller circuit including:

a flip-flop having a clock input, operatively connected to said second means, for receiving the horizontal start signal, having a reset input connected to said video divider chain for receiving the clock stop signal, and having an output; and a first OR gate, having a first input connected to the output of said flip-flop, having a second inverted input connected to said space control circuit and having an output connected to the clock.

8. A system as set forth in claim 7, further comprising means for generating first and second enable signals, wherein said space control circuit comprises:

a first one-shot multivibrator, operatively connected to said video divider chain and the computer, for generating a first space stop signal in dependence upon the first enable signal and the character repetition signal;

a second one-shot multivibrator, operatively connected to said video divider chain and the computer, for generating a second space stop signal in dependence upon the second enable signal and the character repetition signal; and a second OR gate, having a first input connected to the first one shot multi-vibrator, having a second input connected to the output of said second one-shot multivibrator, and having an output connected to the second input of said first OR gate for providing either the first space stop signal or the second space stop signal as the spacing signal.

9. A system as set forth in claim 2, wherein said fifth means comprises a video insert keyer circuit, operatively connected to said first means and the computer, for generating the composite video signal and a stripped computer video signal, said system further comprising a summing amplifier, operatively connected to said sync separator circuit and to the video insert keyer circuit, for receiving the stripped computer video signal and the sync signal and for providing, as an output, a combined stripped computer video signal and sync signal.

10. A system as set forth in claim 9, wherein said video insert keyer circuit comprises:

means for providing a second half level reference signal;

a third comparator, operatively connected to the computer and to said means for providing the second half level reference signal, for generating the stripped computer video signal and the inverted stripped computer video signal;

means for providing a variable DC reference level signal;

a key switch circuit, operatively connected to said means for providing the variable DC reference level signal, the third comparator and said first means, for providing, as an output, one of the variable DC reference level signal and the NTSC video signal in dependence upon the stripped computer video signal and the inverted stripped computer video signal; and a video distribution amplifier for receiving the output from the key switch circuit and for providing the output as the composite video signal.

11. A system, operatively connected to a computer for generating a computer video signal, for overlaying the computer video signal on an NTSC video signal, comprising:

first means for providing the NTSC video signal;

second means, operatively connected to said first means and the computer, for receiving the NTSC video signal and the computer video signal and for generating a vertical reset signal, a horizontal start signal and a composite video signal; and third means, operatively connected to said second means and the computer, for receiving the vertical reset signal and the horizontal start signal and for generating control signals for controlling the rate at which the computer generates the computer video signal, so that the computer video signal is generated at the same rate as the NTSC video signal.

12. A system as set forth in claim 11, wherein said second means comprises:

a sync separator circuit, operatively connected to said first means, for receiving the NTSC video signal and for providing, as an output, a sync signal;

a vertical pulse processor circuit, operatively connected to said sync separator circuit and said third means, for receiving the sync signal and for generating the vertical reset signal; and a horizontal pulse processor circuit, operatively connected to said sync separator circuit and said third means, for receiving the sync signal and for generating the horizontal start signal; and a video insert keyer circuit, operatively connected to said first means and to the computer, for receiving the NTSC video signal and the computer video signal and for generating the composite video signal.

13. A system as set forth in claim 11 or 12, wherein said third means comprises:

a clock controller circuit, operatively connected to said second means, for receiving the horizontal start signal and for generating a clock control signal;

a clock, operatively connected to said clock controller circuit, for receiving the clock control signal and for generating a clock signal; and a video divider chain, operatively connected to said second means, said clock controller circuit, said clock and the computer, for receiving the clock signal and the vertical reset signal, for providing a clock stop signal to said clock controller circuit and for providing the control signals to the computer.

14. A system as set forth in claim 13, wherein said video divider chain further generates a character repetition signal and wherein said third means further comprises a space control circuit, operatively connected between said video divider chain and said clock controller circuit, for receiving the character repetition signal and for generating a spacing signal for said clock controller circuit, wherein the clock control signal is provided to said clock by said clock controller circuit in dependence upon the horizontal start signal, the clock stop signal and the spacing signal.

15. A system as set forth in claim 14, wherein said clock controller circuit comprises:

a flip-flop having a clock input connected to said second means for receiving the horizontal start signal, having a reset input operatively connected to said video divider chain for receiving the clock stop signal, and having an output; and a first OR gate having a first input connected to the output of said flip-flop, having a second input connected to said space control circuit for receiving the spacing signal and having an output connected to said clock.

16. A system as set forth in claim 15, wherein said video divider chain comprises:

a first counter, operatively connected to said clock and to said space control circuit, for receiving the clock signal and for generating the character repetition signal;

a second counter, operatively connected to said first counter and to the computer, for generating a first of the control signals;

a third counter, operatively connected to said second counter, the reset input of said flip-flop and the computer, for generating the clock stop signal and a second of the control signals; and fourth, fifth and sixth counters, operatively connected to the third counter, said second means and the computer, for receiving the vertical reset signal and for generating a fourth, fifth and sixth of the control signals, respectively.

17. A system as set forth in claim 12, wherein said video insert keyer circuit also generates a stripped computer video signal and wherein said second means further comprises a summing amplifier, operatively connected to said video insert keyer circuit and to said sync separator circuit, for receiving the sync signal and the stripped computer video signal and for providing the combined computer video signal and sync signal.

18. A system as set forth in claim 12, further comprising an RF modulator, operatively connected to said video insert keyer circuit, for receiving the composite video signal and for generating an RF modulated composite video signal.

19. A system as set forth in claim 13, wherein said vertical pulse processor circuit comprises:

a ramp generator, operatively connected to said sync separator circuit, for generating a sawtooth signal;

means for providing a first three-forths level reference signal;

a first comparator, operatively connected to said means for providing the first three-forths level reference signal and to the ramp generator, for generating a vertical sync signal;

a first one-shot multivibrator, operatively connected to said first comparator, for generating a first monostable signal;

a second one-shot multivibrator, operatively connected to said first one-shot multivibrator, for generating a second monostable signal having a variable pulse width; and a first differentiator, operatively connected to said second one-shot multivibrator and to said video divider chain, for generating the vertical reset signal.

20. A system as set forth in claim 19, wherein said horizontal pulse processor circuit comprises:

a third one-shot multivibrator, operatively connected to said sync separator circuit, for generating a third monostable signal;

a fourth one-shot multivibrator, operatively connected to said third one-shot multivibrator, for generating a fourth monostable signal having a variable pulse width; and a second differentiator, operatively connected to said fourth one-shot multivibrator and to said clock controller circuit, for generating the horizontal start signal.

21. A system as set forth in claim 20, wherein said sync separator circuit comprises:

an amplifier, operatively connected to said first means, for amplifying the NTSC video signals;

means for providing a first half level reference signal; and a second comparator, operatively connected to said amplifier and said means for providing the first half level reference signal, for generating the sync signal.

* * * * *

UNITED STATES PATENT AND TRADEMARK OFFICE
CERTIFICATE OF CORRECTION

PATENT NO. : 4,425,581
DATED : JANUARY 10, 1984
INVENTOR(S) : DARRELL L. SCHWEPPE ET AL.

It is certified that error appears in the above-identified patent and that said Letters Patent is hereby corrected as shown below:

Col. 4, line 4, "three forths" should be --three-fourths--.

Col. 7, line 36, "three forths" should be --three-fourths--;
line 39, "three forths" should be --three-fourths--.

Col. 10, line 50, "three-forths" should be --three-fourths--;
line 53, "three-forths" should be --three-fourths--.

Signed and Sealed this

Seventeenth Day of April 1984

[SEAL]

Attest:

GERALD J. MOSSINGHOFF

Attesting Officer  Commissioner of Patents and Trademarks